(12) United States Patent
Murugan

(10) Patent No.: US 11,611,492 B2
(45) Date of Patent: Mar. 21, 2023

(54) CONVERSATIONAL BOTS PLATFORM

(71) Applicant: salesforce.com, inc., San Francisco, CA (US)

(72) Inventor: Rakesh Murugan, Sydney (AU)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 17/687,727

(22) Filed: Mar. 7, 2022

(65) Prior Publication Data

US 2022/0191111 A1 Jun. 16, 2022

Related U.S. Application Data

(63) Continuation of application No. 16/914,378, filed on Jun. 28, 2020, now Pat. No. 11,271,830.

(51) Int. Cl.
*G06F 15/16* (2006.01)
*H04L 41/50* (2022.01)
*H04L 51/02* (2022.01)
*H04L 41/5051* (2022.01)
*H04L 67/289* (2022.01)
*G10L 13/047* (2013.01)
*G06F 40/30* (2020.01)
*G06V 10/40* (2022.01)
*H04L 67/01* (2022.01)

(52) U.S. Cl.
CPC .......... *H04L 41/5093* (2013.01); *G06F 40/30* (2020.01); *G06V 10/40* (2022.01); *G10L 13/047* (2013.01); *H04L 41/5051* (2013.01); *H04L 51/02* (2013.01); *H04L 67/01* (2022.05); *H04L 67/289* (2013.01)

(58) Field of Classification Search
CPC ... H04L 41/5093; H04L 67/289; H04L 51/02; H04L 41/5051; H04L 67/42; G06K 9/46; G06F 40/30; G10L 13/047
See application file for complete search history.

(56) References Cited

U.S. PATENT DOCUMENTS

| | | | |
|---|---|---|---|
| 7,603,413 B1 * | 10/2009 | Herold | H04L 12/1813 709/204 |
| 10,437,507 B2 * | 10/2019 | Tormasov | G06F 3/065 |
| 10,467,792 B1 * | 11/2019 | Roche | G06F 40/20 |
| 10,872,116 B1 * | 12/2020 | Yim | G06F 16/61 |

(Continued)

OTHER PUBLICATIONS

Interview Summary dated May 3, 2021 from U.S. Appl. No. 16/914,378. (2 pages).

(Continued)

*Primary Examiner* — Richard G Keehn

(57) ABSTRACT

Provided herein are system, methods and computer program products for using a bot server for initiating and controlling bot instances, specifically conversation bot instances at client devices for interacting with users associated with the client devices. The bot server may communicate with a remote cloud service providing bot services for initiating and operating the bot instances to retrieve logic metadata used to control the bot instances and may use this metadata to initiate and control one or more bot instances at the client devices to interact with the associated users. In particular, the bot server may be deployed at a network edge in close network proximity to the client devices.

16 Claims, 4 Drawing Sheets

(56) References Cited

U.S. PATENT DOCUMENTS

| | | | | |
|---|---|---|---|---|
| 2009/0216691 | A1* | 8/2009 | Borzestowski | G06F 16/3332 |
| | | | | 715/706 |
| 2012/0059787 | A1* | 3/2012 | Brown | G06F 40/169 |
| | | | | 715/752 |
| 2013/0194280 | A1* | 8/2013 | Kwon | G06T 15/00 |
| | | | | 345/473 |
| 2015/0172505 | A1* | 6/2015 | Park | H04N 1/00307 |
| | | | | 358/1.15 |
| 2016/0217601 | A1* | 7/2016 | Tsuda | A63F 13/655 |
| 2018/0343060 | A1* | 11/2018 | Aiba | G02B 6/4279 |
| 2019/0266775 | A1* | 8/2019 | Lee | G06V 40/166 |
| 2020/0041972 | A1* | 2/2020 | Hong | G05B 19/0428 |
| 2020/0177528 | A1* | 6/2020 | Takishima | H04L 51/02 |
| 2020/0192978 | A1* | 6/2020 | Sivagnanam | G06K 9/6215 |
| 2020/0228565 | A1* | 7/2020 | Reverte | H04L 43/16 |
| 2020/0285799 | A1* | 9/2020 | Young | G06T 13/40 |
| 2020/0412912 | A1* | 12/2020 | Maeda | H04N 1/603 |
| 2021/0124623 | A1* | 4/2021 | Zou | G06F 9/455 |
| 2021/0409292 | A1 | 12/2021 | Murugan | |

OTHER PUBLICATIONS

Notice of Allowance dated Oct. 29, 2021 from U.S. Appl. No. 16/914,378. (6 pages).
Official Action dated Jun. 29, 2021 from U.S. Appl. No. 16/914,378. (17 pages).

* cited by examiner

CONVERSATIONAL BOTS PLATFORM

RELATED APPLICATION

This application is a Continuation of U.S. patent application Ser. No. 16/914,378 filed on Jun. 28, 2020. The contents of the above applications are all incorporated by reference as if fully set forth herein in their entirety.

TECHNICAL FIELD

The present disclosure relates generally to controlling conversational bots interacting with users, and more specifically to enhancing control of conversational bots interacting with users by using a bot server deployed at network edge.

BACKGROUND

The use of online software robots, commonly known as bots, for interacting with human users has rapidly and widely spread in recent years and is deployed for an ever increasing range of applications ranging from support, service, through online shopping and gaming to online learning, medical assistance to name just a few.

The bots which are typically executed by client devices associated with the users may take many forms, for example, textual dialogs, conversational interaction (e.g. speech, voice) and even multimedia forms, for example animated avatars supported by voice synthesizers which may interact with the users imitating a human counterpart.

BRIEF DESCRIPTION OF THE SEVERAL VIEWS OF THE DRAWINGS

Some embodiments are herein described, by way of example only, with reference to the accompanying drawings. With specific reference now to the drawings in detail, it is stressed that the particulars are shown by way of example and for purposes of illustrative discussion of some embodiments. In this regard, the description taken with the drawings makes apparent to those skilled in the art how some embodiments may be practiced.

In the drawings.

DESCRIPTION OF SPECIFIC EMBODIMENTS OF THE INVENTION

Figure 1:
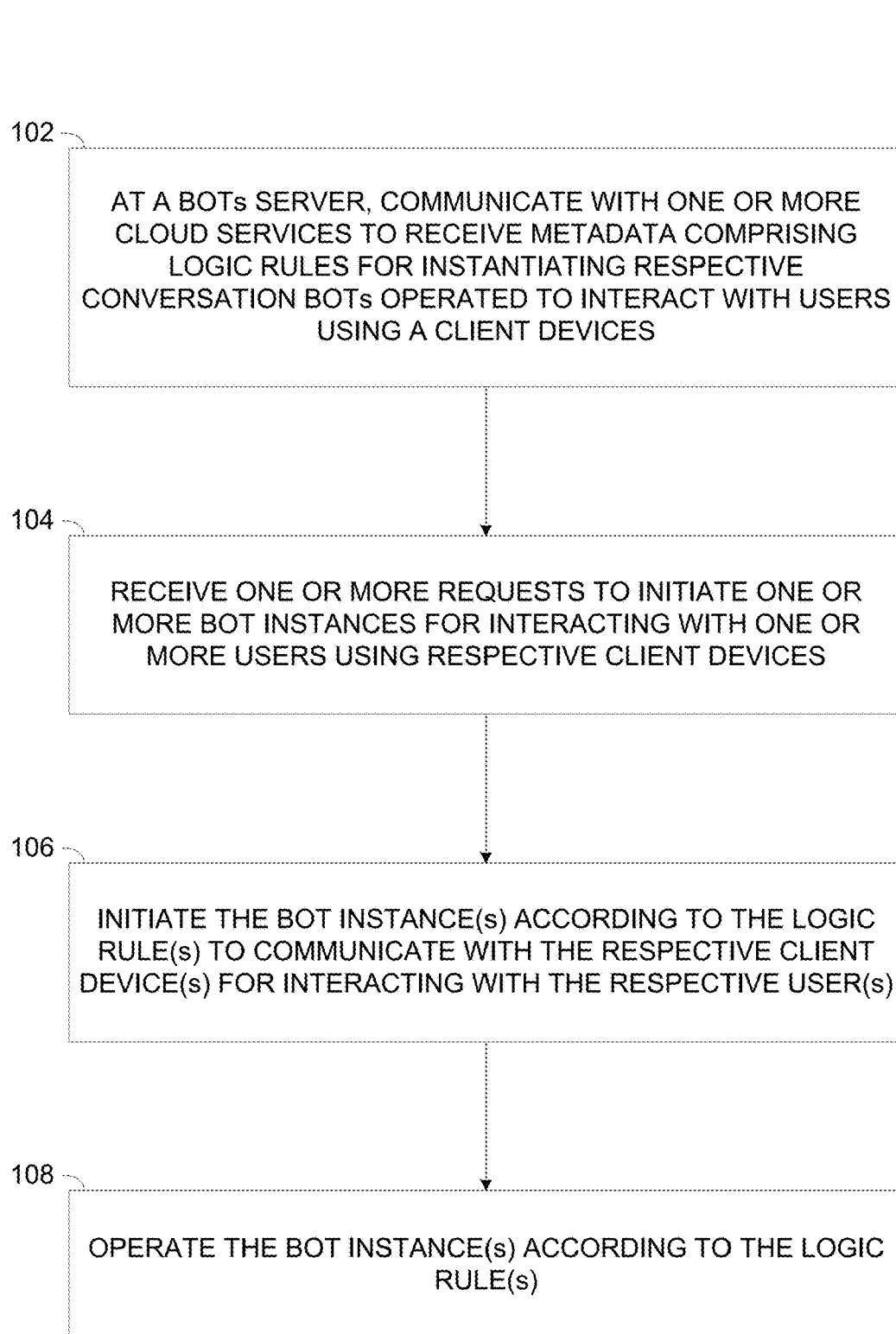
FIG. 1 is a flowchart of an exemplary process of controlling conversational bots interacting with users by using a bot server, in accordance with some embodiments.

According to a first aspect disclosed herein, a computer implemented method of controlling conversational bots interacting with users comprises: communicating with one or more cloud services to receive metadata comprising one or more logic rules predefined for instantiation of conversation bots operated to interact with users using client devices, receiving one or more requests to initiate one or more bot instance for interacting with at least one of a plurality of users using a respective one of a plurality of client devices connected to a network, initiating the one or more bot instances according to one or more of the logic rules to communicate with the respective client device(s) for interacting with one or more user(s), and operating the one or more bot instances according to one or more of the logic rules.

According to a second aspect disclosed herein, bot server for controlling conversational bots interacting with users, comprises: one or more processors executing a code. The code comprises: code instructions to communicate with one or more cloud services to receive metadata comprising one or more logic rules predefined for instantiation of conversation bots operated to interact with users using client devices, code instructions to receive one or more requests to initiate one or more bot instance for interacting with at least one of a plurality of users using a respective one of a plurality of client devices connected to a network, code instructions to initiate the one or more bot instances according to one or more of the logic rules to communicate with the respective client device(s) for interacting with one or more user(s), and code instructions to operate the one or more bot instances according to one or more of the logic rules.

In a further implementation form of the first and second aspects, the bot server is an edge server located in close network proximity to an access point providing the respective client device connectivity to the network.

In a further implementation form of the first and second aspects, the bot server implemented as a Platform as a Service (PaaS) applies at least one PaaS framework to facilitate a communication interface for communicating with the at least one cloud service.

In a further implementation form of the first and second aspects, one or more of the cloud services are utilized using at least one Software as a Service (SaaS) framework.

In a further implementation form of the first and second aspects, the one or more logic rules define the interaction with the at least one user comprises at least one of: a predefined dialog flow, a condition, and a trigger event.

In an optional implementation form of the first and second aspects, the bot server initiates one or more of the bot instances and/or the adjusts the operation of one or more of the bot instances based on a content of one or more messages received from the respective client device. The one or more messages originate from the respective users interacting with the one or more of the bot instances.

In an optional implementation form of the first and second aspects, the bot server initiates one or more of the bot instances and/or the adjusts the operation of one or more of the bot instances in response to one or more trigger events detected for one or more respective users.

In an optional implementation form of the first and second aspects, the operation of one or more of the bot instances is adjusted according to a state of the respective bot instances defined by one or more conditions of previous engagement with the respective users.

In an optional implementation form of the first and second aspects, the bot server retrieves additional data from one or more of the cloud services in response to interaction with one or more of the users.

In an optional implementation form of the first and second aspects, the bot server adjusts the operation of one or more of the bot instances according to one or more of a plurality of contextual attributes identified for one or more respective users. The plurality of contextual attributes comprising one or more members of a group consisting of: a gender, an age, an intent, a sentiment, a mood, a scene, a geographical location, and/or an environmental condition In an optional implementation form of the first and second aspects, the bot server communicates with one or more Natural Language Processing (NLP) services to obtain one or more of the plurality of contextual attributes.

In an optional implementation form of the first and second aspects, the bot server communicates with one or more additional services to obtain one or more of the plurality of contextual attributes.

In an optional implementation form of the first and second aspects, one or more image processing tools are applied to analyze one or more images depicting one or more of the users to extract one or more of the plurality of contextual attributes.

In an optional implementation form of the first and second aspects, the metadata and one or more of the contextual attributes are provided for manipulation of one or more avatars presented to one or more of the users to represent one or more respective bot instances.

In an optional implementation form of the first and second aspects, the metadata and one or more of the contextual attributes are provided for manipulation of one or more text-to-speech synthesizers operated to produce an audio output to one or more of the users.

Provided herein are system, apparatus, device, method and/or computer program product embodiments, and/or combinations and sub-combinations thereof, for using a bot server to initiate and control one or more bot instances executed by one or more client devices for interacting with respective user(s) associated with the client device(s).

Each user using a respective client device, for example, a server, a computer, a mobile device (e.g. Smartphone, tablet, etc.), a web browser, or any other suitable computing device may connect to a network for one or more of a plurality of applications, for example, web browsing, online support and/or service, online shopping, e-commerce, eLearning, online gaming and/or the like. In particular, one or more of the users may be interacted with by one or more respective bot instances executed by their respective client devices.

The bot instances may be initiated, operated and/or controlled by a bot server which may be deployed in close network proximity to the client devices. Specifically, the bot server may be deployed in close network proximity to one or more access points providing network connectivity to the client devices, for example, in an edge server, edge computing node and/or the like located at an edge of the network and is therefore in close network proximity to the access points connecting the client devices to the network. As such communication between the bot server and each of the client devices may be characterized by high speed, low latency and/or high robustness to network failures since the network traffic exchanged between them is localized, thus requiring only few hops, potentially only one to reach its destination.

The bot server may communicate with one or more cloud services which provide one or more bot services for instantiating and controlling bots, specifically conversational bots configured to interact with the users via their client devices. In particular, the bot server may communicate with the cloud service(s) to obtain data and more specifically metadata stored by the cloud service(s) which is typically unique to each organization, client, customer and/or the like associated with the cloud service(s).

The metadata may define one or more logic rules relating to dialog flows, dialog logic, routes between dialogs, intents, entities, variables and/or the like for instantiating and controlling bot instances instantiated for interacting with users.

The metadata may typically realize one or more decision trees each comprising nodes and branches where each node represents a state which may be a start of a new branch, whilst each branch is a unique dialog (conversational) flow.

The cloud service(s) may be structured in a centralized architecture, typically as a Software as a Service (SaaS) platform accessible via the network, for example, via the internet.

In contrast to the centralized cloud service(s), the bot server may be deployed at the network edge optionally as a Platform as a Service (PaaS) service according to one or more PaaS frameworks and/or platforms, for example, Heroku and/or the like.

In order to enhance its performance and make it readily available to initiate and control bot instances for interacting with the users, the bot server may obtain the metadata and optionally other data from the cloud service(s) during and/or following an initialization (boot-up) sequence, for example, a power cycling, a power-up event, a reset event and/or the like. As such, the bot server may obtain the metadata in advance independently and irrespectively of any request to initiate bot instances. However, the bot server may not persistently store the data and the metadata obtained from the cloud service(s) thus significantly increasing its safety and security.

The bot server may employ one or more protocols, layers, Application Programming Interfaces (API) and/or the like provided, supported and/or available by the PaaS framework to communicate with the cloud service(s) to obtain the data and metadata specific to the cloud service(s) and/or to communicate with one or more of the client devices to initiate and control the bot instances executed by the client device(s).

The bot server may then initiate and further control one or more bot instances at one or more of the client devices for interacting with the respective users. The bot server may apply a passive approach and initiate one or more of the bot instances in response to requests and/or instructions originating from the respective users. However, the bot server may further exercise a more active and proactive approach and initiate and/or control one or more of the bot instances according to one or more trigger events defined for one or more of the users, for example, conditions relating to user behavior, user actions, user intentions and/or the like. In particular, the bot server may take advantage of provisions available by the PaaS framework to easily and effectively publish/subscribe the trigger events at the client devices.

Optionally, the bot server may adjust the initiation and/or operation of one or more of the bot instances according to one or more contextual attributes relating to one or more of the users, for example, personal attributes (e.g., gender, age, etc.), behavioral attributes (e.g. intent, sentiment, mood, etc.), timing attributes, geolocation attributes, a scene of the user(s), a background of the user(s), environmental conditions, (e.g. weather, etc.) and/or the like. To this effect, the bot server may communicate with one or more context systems, platforms and/or services configured to provide such contextual attributes, for example, an NLP service, a weather service, a geolocation service, a visual analysis service capable of analyzing and identifying features in the physical background of the user(s) and/or the like.

Deploying a bot server to initiate and control bot instances for interacting with users may present major benefits and advantages compared to existing bot control systems, specifically cloud based bot services.

First, the existing cloud bot service are typically centralized services which may be significantly distant in terms of network connectivity from the users served with the bot instances. This may naturally lead to major latency and delays which may significantly degrade the user experience of the users interacting with the bots, in particular the conversational bots where the voice and speech interaction may be extremely sensitive to large delays. The bot server, in contrast, may be deployed at the network edge corresponding to the geographical area where the users are located. The bot server may be therefore in very close network proximity to the client devices which may significantly reduce the latency and delays for the interaction between the user and the bot instances and significantly improving the user experience of the users.

Moreover, as the cloud service(s) may be remote from the users, an intermediary layer is typically deployed to relay the messages between the client devices and the cloud service. This additional intermediate layer may naturally add latency which may further degrade the users experience and may potentially increase complexity and/or utilization of computing resources (e.g., processing resources, storage resources, network resources, etc.) since large volumes of data relating to a plurality of bot instances may need to be transmitted to the cloud service(s). Moving such large data volumes over the network may also significantly reduce scalability of the cloud service and its ability to support large numbers of bot instances and may further increase network usage costs. The bot server on the other hand which does not require such an intermediary layer, may fetch the metadata once form the cloud service and manage all bot services locally thus significantly reducing the network utilization. Moreover, the bot server may be highly scalable since multiple bot servers may be deployed at various locations at the network edge in particular in correspondence to the geographical areas where the users are located.

Furthermore, as the bot server may be deployed and/or implemented using standard available PaaS resources, the bot server may be easily deployed and thus highly adopted.

In addition, due to its centralize nature, the cloud service may be deployed at one geographical area and thus follow and abide to privacy rules, laws and/or regulations applicable to its geographical are. However, these privacy rules, laws and/or regulations may conflict and/or violate other privacy rules, laws and/or regulations which may be applicable and enforced in the geographical area where the end users are located thus presenting a major privacy issue. The bot server on the other hand is located in the same geographical area as the target users and may therefore initiate and/or operate the bot instances according to the same privacy rules, laws and/or regulations applicable for the end users thus ensuring no violation in data and/or user privacy.

Also, the existing cloud services may typically lack the ability to store state data for the bot instances with respect to previous interaction and engagement with the users. The bot server, on the other hand, may store the state of one or more of the bot instances and may adapt and adjust the bot instances' operation according to the stored state thus further increasing the flexibility, effectivity and/or benefit of the bot instances to support the users.

Moreover, the legacy cloud service may be limited in its ability to communicate and interact with external context and/or NLP platforms and services. The cloud service may therefore rely on its internal context extractors and/or NLP engines which may be inferior to the external context and/or NLP platforms and services. The bot server on the other hand, specifically by taking advantage of the functional protocols, APIs and/or other provisions available by the PaaS, may easily communicate and interact with the external context and/or NLP platforms and services which may typically be typically higher performance and more advanced compared to the legacy cloud service tools. The bot server may therefore better adjust the operation of the bot instances according to more accurately identified contextual attributes, intents, sentiments, moods and/or the like thus further improving the users experience and/or increasing effectivity of the bot instances in supporting the users.

Lastly, when communicating with the cloud service(s), the bot server may follow the existing interfaces, protocols and/or APIs employed by the cloud service(s) thus requiring no alteration, adaptation and/or re-design of the cloud service. This makes the bot server applicable for operating with the existing cloud services as is which may significantly reduce deployment costs and contribute to wide and fast adoption of the bot server solution.

Unless otherwise defined, all technical and/or scientific terms used herein have the same meaning as commonly understood by one of ordinary skill in the art to which embodiments pertain. Although methods and materials similar or equivalent to those described herein can be used in the practice or testing of embodiments, exemplary methods and/or materials are described below. In case of conflict, the patent specification, including definitions, will control. In addition, the materials, methods, and examples are illustrative only and are not intended to be necessarily limiting.

Before explaining at least one embodiment in detail, it is to be understood that the embodiment(s) is not necessarily limited in its application to the details of construction and the arrangement of the components and/or methods set forth in the following description and/or illustrated in the drawings and/or the Examples. The embodiment(s) is capable of other embodiments or of being practiced or carried out in various ways.

Embodiments may be implemented as a system, a method, and/or a computer program product. The computer program product may include a computer readable storage medium (or media) having computer readable program instructions thereon for causing a processor to carry out aspects.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects.

Aspects are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of controlling conversational bots interacting with users by using a bot server, in accordance with some embodiments. An exemplary process 100 may be executed by a bot server to initiate and control one or more bot (software robot) instances for interacting with one or more users using respective client devices.

Figure 2:
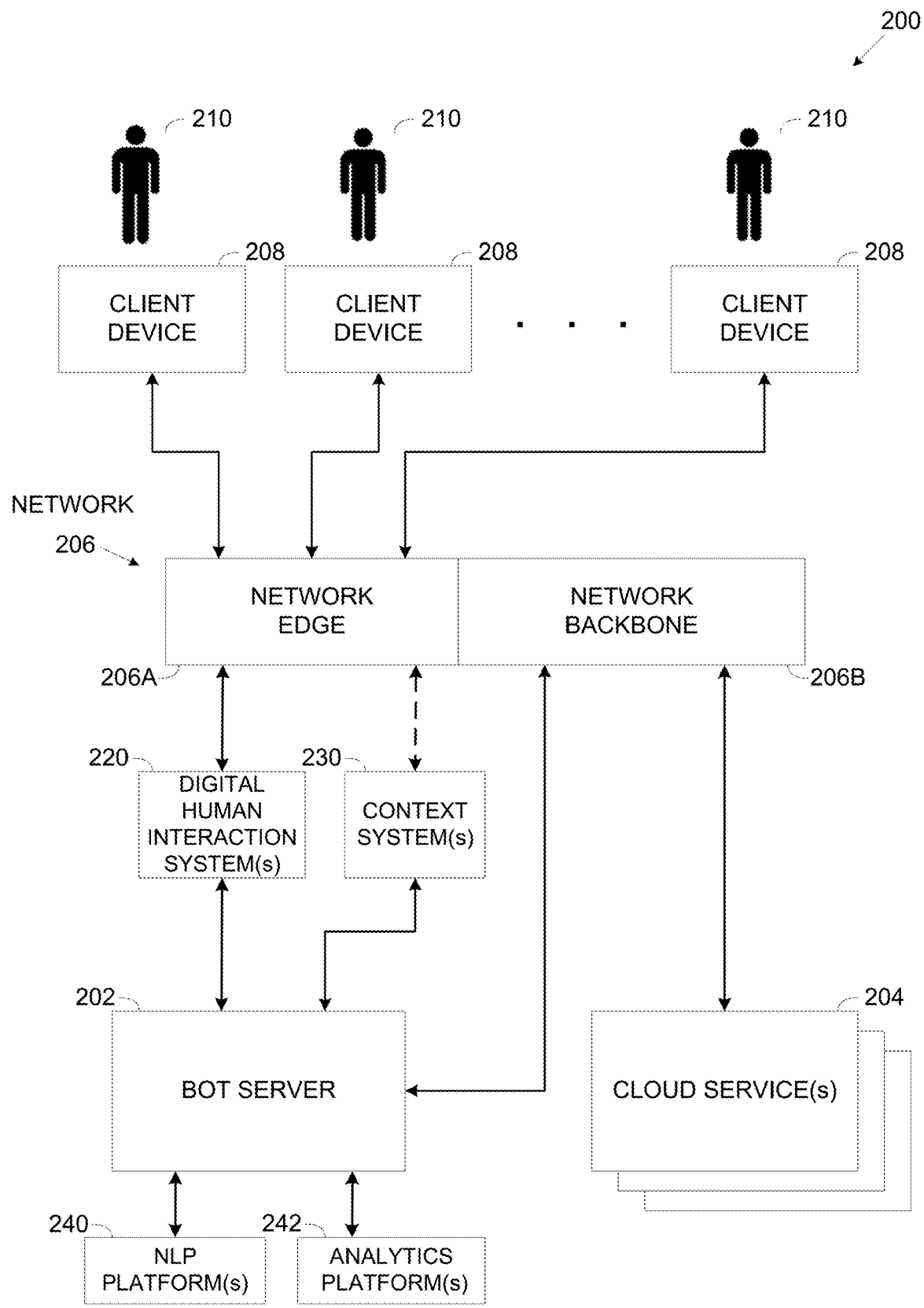
FIG. 2 is a schematic illustration of an exemplary system for controlling conversational bots interacting with users by using a bot server, in accordance with some embodiments.

Reference is also made to FIG. 2, which is a schematic illustration of an exemplary system for controlling conversational bots interacting with users by using a bot server, in accordance with some embodiments.

A system environment 200 may include a bot server 202, for example, a server, a computing node, a cluster of computing modes and/or the like configured to execute a process such as the process 100 for serving, initiating and controlling one or more bot instances, specifically conversational bots for interacting with one or more users 210 using respective client devices 208.

One or more of the client devices 208, for example, a server, a computer, a mobile device (e.g. Smartphone, tablet, etc.), a web browser, or any other suitable computing device may connect to the bot server 202 via a network 206 comprising one or more wired and/or wireless networks, for example, a Local Area Network (LAN), a Wide Area Network (WAN), a Municipal Area Network (MAN), a wireless LAN (e.g. Wi-Fi), a cellular network, the Internet and/or various other types of networks as would be appreciated by a person of ordinary skill in the art.

The bot server 202 may include a network interface for connecting to the network 206, a processor(s) for executing the process 100 and a storage for storing code (program store) and/or data.

The processor(s), homogenous or heterogeneous, may include one or more processors arranged for parallel processing, as clusters and/or as one or more multi core processor(s). The storage may include one or more non-transitory persistent storage devices, for example, a Read Only Memory (ROM), a Flash array, a hard drive and/or the like. The storage may also include one or more volatile devices, for example, a Random Access Memory (RAM) component, a cache memory and/or the like. The storage may further include one or more network storage resources, for example, a storage server, a network accessible storage (NAS), a network drive, a cloud storage and/or the like accessible via the network interface.

The processor(s) may execute one or more software modules, for example, a process, a script, an application, an agent, a utility, a tool, an algorithm and/or the like each comprising a plurality of program instructions stored in a non-transitory medium (program store) such as the storage. The processor(s) may further include, utilize and/or facilitate one or more hardware modules (elements) available to the bot server 202, for example, a circuit, a component, an Integrated Circuit (IC), an Application Specific Integrated Circuit (ASIC), a Field Programmable Gate Array (FPGA), a Digital Signals Processor (DSP), a network processor, an Artificial Intelligence (AI) accelerator and/or the like.

The bot server 202 may therefore execute one or more functional modules to execute the process 100, where the functional module(s) may be implemented through one or more software modules, one or more of the hardware modules and/or a combination thereof.

In particular, the bot server 202 may be utilized by an edge server located on a network edge 206A of the network 206 in close network proximity to an access point providing the client device(s) 208 connectivity and access to the network 206. Communication between the bot server 202 and each of the client device(s) 208 may be therefore significantly fast, low latency and highly robust since the network traffic exchanged between them is localized and thus requiring only few hops, potentially only one to reach its destination.

It should be noted, that for brevity a single bot server 202 is described in the system 200. This however, should not be construed as limiting since a plurality of bot servers 202 may be deployed for serving a plurality of client devices 208. In particular, multiple bot servers 202 may be deployed at different network edges 206 according to the geolocation of the users 210 such that the bot servers 202 may be in close network proximity to the access point serving the client devices 208 used by these users 210.

The bot server 202 may communicate with one or more cloud services 204 which provide one or more bot services for instantiating and controlling bots, specifically conversational bots configured to interact with the users 210 (via their client devices 208) for one or more applications, for example, service, support, learning, gaming and/or the like.

Each such cloud service 204 which may be implemented using one or more cloud platforms, frameworks and/or technologies as known in the art, for example, Software as a Service (SaaS) and/or the like may be owned, operated, controlled and/or otherwise associated with one or more organizations, for example, a company, a service, an agency, an institutions and/or the like which may be private, public, commercial, governmental and/or the like.

An exemplary such cloud service 204 is the Salesforce service cloud providing the Einstein bot to support users 210 using the Salesforce Client Relationship Management (CRM) system.

Each cloud service 204 may be associated with a respective organization and may therefore comprise respective data and metadata unique to each organization, client, customer and/or the like. While the data may include data and records, for example, accounts, contacts, assets, orders and/or the like, the metadata may define one or more logic rules relating to dialog flows, dialog logic, routes between dialogs, intents, entities, variables and/or the like for instantiating and controlling bot instances instantiated for interacting with users such as the users 210.

The metadata may typically realize one or more decision trees each comprising nodes and branches where each node represents a state which may be a start of a new branch, whilst each branch is a unique dialog (conversational) flow. Hence, the metadata includes dialogs and logic to route within and/or between dialogs. This means that the metadata describes the functional logic that underpins the conversational bot(s) by describing supported dialogs (conversations), its corresponding intents and all messages, actions & navigations contained within each dialog flow.

The cloud service(s) 204 may be typically architectured and constructed as a centralized service which may be accessed via the network 206, in particular via a network backbone 206B of the network 206 which constitutes the backbone infrastructure of the network 206, for example, the internet. The bot server 202 may therefore connect and communicate with the cloud service(s) 204 via the network backbone 206B.

Optionally, the bot server 202 is implemented as a Platform as a Service (PaaS) according to one or more PaaS frameworks and/or platforms, for example, Heroku and/or the like to facilitate a communication interface for communicating with the at client device(s) 208 on one hand and with the cloud service 204 on the other hand. For example, the bot server 202 is may be implemented as a NodeJS application running on the Heroku PaaS framework.

The PaaS platform may present major advantages which may significantly scale and/or expedite the bot server 202 design and/or deployment, for example, an extensive programing base, interfaces and/or mechanisms, support for a wide range of communication and/or hand-shaking protocols and/or the like.

The bot server 202 may use one or more frameworks, mechanisms, APIs and/or the like for communicating with one or more of the client devices 208, specifically for instantiating and/or controlling the bot instances executed by the client devices 208, optionally such frameworks, mechanisms, APIs and/or the like provided and/or supported by the PaaS framework. For example, the bot server 202 may use Representational State Transfer (REST) API which may be supported by the PaaS framework to control one or more of the conversational bot instances executed by one or more of the client devices 208.

Moreover, the bot server 202 may apply, integrate, communicate with and/or otherwise employ one or more digital human interaction systems, services and/or platforms 220 (collectively designated digital human interaction systems 220 herein after), for example, a speech to text conversion system (e.g. Google cloud), a text to speech synthesizing system, an animation system for creating and controlling an avatar representing the bot instance and/or the like.

Furthermore, the bot server 202 may communicate with one or more context systems, platforms and/or services 230 (collectively designated context system 230 herein after) configured to provide one or more contextual attributes relating to one or more of the users 210. One or more of the context system(s) 230 may optionally communicate with the respective client devices 208 associated with one or more of the users 210. The context system(s) 230 may include, for example, a timing system adapted to provide one or more contextual timing attributes relating to one or more of the users 210, for example, time, data, a weekday, a weekend, a holiday and/or the like. In another example, the context system(s) 230 may include, a geolocation system adapted to provide a geolocation contextual attribute of one or more of the users 210, for example, based on a geolocation of the client device 208 associated with the respective user(s) 210 extracted for example, from a Global Positioning System (GPS) sensor of the respective client device 208. In another example, the context system(s) 230 may include an image processing system configured to analyze one or more images of one relating to one or more of the users 210, a scene of one or more of the users 210, a background of one or more of the users 210 and/or the like. Based on the analysis of the image(s) which may be captured by one or more imaging sensors of the client device 208 associated with the respective user(s) 210, the context system(s) 230 may extract one or more contextual attributes, for example, location (office, home, car, train, etc.), company (alone, family, friends, etc.), an environmental condition (e.g. lit/dark, sunny, raining, etc.) and/or the like. In another example, the context system(s) 230 may include a weather systems and/or service which may provide one or more weather contextual attributes relating to one or more of the users 210, specifically based on their geolocation, for example, temperature, precipitation and/or the like.

The bot server 202 may further communicate with one or more Natural Language Processing (NLP) platforms, systems and/or services 240 (collectively designated NLP platform 240 herein after) designed and configured to analyze speech, text, voice and/or the like of one or more of the users 210 and identify one or more contextual attributes, specifically emotional attributes of the user 210, for example, an intent, a sentiment, a mood and/or the like.

In addition, the bot server 202 may communicate with one or more analytics platforms, systems and/or services 242 (collectively designated analytics platform 242 herein after) designed and configured to collect interaction data from a plurality of interaction sessions of the bots with the user(s) 210. The analytics platform 242 may analyze the collected data (big data) in order to identify one or more patterns relating to the users 210, in particular during interaction with the bots, for example, interaction, behavioral and/or other patterns.

Optionally, the bot server 202 may communicate with one or more of the client devices 208, for example, with a web browser, an application, a mobile application and/or the like in order to publish and/or subscribe to events occurring at the respective client device(s) 208. For example, the bot server 202 may subscribe to one or more events detected at one or more of the client devices 208, for example, an event initiated by the respective user(s) 210, an event initiated in response to one or more actions and/or operations of the respective user(s) 210 (i.e., behavior of the user 210) and/or the like. The bot server 202 may further publish one or more events at one or more of the client devices 208, for example, instruct the respective client device(s) 208 to display one or more messages to the associated user(s) 210, instruct the respective client device(s) 208 to playback one or more audio messages to the associated user(s) 210 and/or the like.

For brevity, the process 100 is described for a single bot server 202 communicating with a single cloud service 204 for initiating and controlling a single bot instance, specifically a single conversational bot instance for interacting with a single user 210 using a respective client device 208. This however, should not be construed as limiting as the process 100 may be expanded to one or more bot servers 202 which may communicate with one or more cloud services 204 to provide bot service to a plurality of users 210 using respective client device(s) 208.

As shown at 102, the process 100 starts with the bot server 202 communicating with the cloud service 204 to receive the metadata of the cloud service 204 and/or part thereof which comprises one or more logic rules predefined for instantiating, controlling and/or operating a bot instance for interacting with one of the users 210 via his respective client device 208.

Each of the logic rules may include, for example, a predefined dialog flow, a condition, a trigger event and/or the like which may predefine an instantiation mode, an operational mode, characteristics and or the like of the bot instance which may be later launched at the client device 208 for interacting with the associated user 210.

The dialog flows may define one or more responses and/or decision trees and/or part thereof which may be followed by the bot instance while interacting with the user 210. The conditions may define one or more events which may define the context of the bot instance and/or how the bot instance should be initiated and/or operated in response to detection of these conditions and/or events. The trigger events may define one or more events which upon detection of these events, the bot instance should be initiated and/or operated accordingly. The trigger event may include one or more events which the bot server 202 should subscribe to at the client device 208 used by the user 210 and/or one or more events which the bot server 202 should publish and define at the client device 208.

The bot server 202 may obtain the metadata independently and irrespectively of receiving any request from the client device 208 to initiate a bot instance for interacting with the users 210 of the respective client device 208.

The bot server 202 may use one or more Application Programming Interfaces (API) supported by the cloud service 204 to retrieve the metadata and/or part thereof. The bot server 202 may further employ one or more mechanisms and/or interfaces provided by the PaaS platform for communicating with the cloud bot server 204. For example, the bot server may utilize Heroku's Connect to synchronize with the metadata and optionally the data received from the cloud service 204.

However, the bot server 202 may store and use the metadata and optionally at least some of the data received from the cloud service 204 on temporary basis such that the metadata (and data) are not persistently stored by the bot server 202. For example, the bot server 202 may retrieve the metadata while and/or following an initialization (boot-up) sequence, for example, following a power cycling, following a power-up event, following a reset event and/or the like. As such, while not persistently stored by the bot server 202, the metadata may be retrieved by the bot server 202 only once following the boot-up sequence. From this time and until a subsequent boot-up sequence, the bot server 202 may locally and non-persistently store the metadata.

After receiving the metadata from cloud service 204, the bot server may construct one or more decision tree for initiating, controlling and/or operating bot instances according to the rule(s) defined by the received metadata.

As shown at 104, the bot server 202 may receive a request to initiate a bot instance for interacting with one of the users 210 using a respective client device 208 connected to the network 206.

The request to initiate the bot instance may be based on one or more messages received from the client device 208 which originate from the user 210 explicitly requesting to launch the bot instance. In other words, in response to one or more actions and/or operations initiated by the user 210 interacting with the client device 208 to launch the bot instance, the client device 208 may transmit the message(s) to this effect, i.e., requesting initiation of the bot instance. For example, the user 210 may launch a web browser in the client device 208 and while browsing a certain website, the user 210 may press a help symbol. In response to the help symbol pressing, the web browser executed by the client device 208 may transmit one or more messages to the bot server 202 requesting to initiate a conversational support bot instance for interacting with the user 210. In another example, using the web browser, the user 210 may press a tutoring assistant symbol. In response to the tutoring assistant symbol pressing, the web browser executed by the client device 208 may transmit one or more messages to the bot server 202 requesting initiate a conversational tutor bot instance for interacting with the user 210.

However, the bot server 202 may undertake a more proactive approach (active) and configure the bot instance request to initiate in response to one or more trigger events detected for the user 210 while interacting with the client device 208. This means that the bot server 202 may configure the bot instance request to initiate based on the behavior of the user 210, specifically the behavior of the user 210 with respect to his client device 208.

The bot server 202 may subscribe to one or more events at the client device 208 and/or publish on the client device 208 one or more events defined by the bot server 202. The bot server 202 may further configure one or more of the subscribed and/or published events to generate a trigger such that in response to detection of the trigger event(s), the client device 208 may transmit the request to initiate the bot instance. For example, the bot server 202 may subscribe to a first trigger event in which while interacting with a web browser executed by the client device 208, in case the user 210 lands on a certain page in a certain website the client device 208 may initiate the request to initiate the bot instance. In another example, the bot server 202 may subscribe to a second trigger event in which while interacting with a web browser executed by the client device 208, in case the user 210 encounters an issue, the client device 208 may initiate the request to initiate the bot instance. In another example, the bot server 202 may publish a third trigger event defining that while interacting with a web browser executed by the client device 208, in case the user 210 selects one a certain item in a certain website (e.g. a service item, a product items, etc.) the client device 208 may initiate the request to initiate the bot instance.

As shown at 106, in response to the initiation request, the bot server 202 may initiate the bot instance at the client device 208 for interacting with the associated user 210.

As described herein before, the bot server 202 may initiate the bot instance in two main modes, a passive mode in which the bot server 202 initiates the bot instance in response to an explicit initiation request originating from the user 210 and a proactive mode in which the bot server 202 proactively engages with the user 210 and initiates the bot instance in response to detection of one or more of the published and/or subscribed trigger events at the client device 208.

Specifically, the bot server 202 may initiate the bot instance according to one or more of the logic rules extracted from the metadata received from the cloud service 204. For example, the bot server 202 may initiate the bot instance executed by the client device 208 to present a certain message predefined by one or more of the logic rules. In another example, the bot server 202 may initiate the bot instance to present a first message of a first dialog flow predefined by one or more of the logic rules in response to detection of a first trigger event and/or a first action initiated by the user 210. However, the bot server 202 may initiate the bot instance to present a second message of a second dialog flow predefined by one or more of the logic rules in response to detection of a second trigger event and/or a second action initiated by the user 210.

As shown at 108, the bot server 202 may further operate the bot instance executed by the client device 208 according to one or more of the logic rules extracted from the metadata received from the cloud service 204.

As done during the initiation of the bot instance, the bot server 202 may also operate the bot instance in the passive mode, in the proactive mode and/or in combination thereof.

Moreover, the bot server 202 may further store data relating to a state of the bot instance initiated and operated at the client device 208 to interact with the associated user 210. The state may be defined by one or more events, conditions, messages content, intent and/or the like identified during previous interaction and engagement with the user 210, for example, a previous selection of the user 210, a response of the user 210, a contextual attribute relating to the user 210 and/or the like.

For example, when initiated to interact with the user 210, the bot server 202 may operate the bot instance to present a first message, for example, "What service are you inquiring about?". In a first use case, the user 210 may respond with one or more responses, for example, "I want to know about dental", or "Tell me about dentists", or "I have tooth pain" and/or the like. In a second use case, the user 210 may respond with one or more responses, for example, "I want to know about physio", or "Physiotherapy services", or "Back pain massage" and/or the like. In both use cases, in response, the bot server 202 may operate the bot instance to respond, for example, "Sure, Tell more" and in response the user 210 may ask, for example, "What is the typical consultation cost?". As evident the final question issued by the user 210 is identical and simply operating the bot instance to respond according to the logic rule(s) may lead to incorrect interaction and/or wrong responses to the user 210. However, since the bot server 202 may save the state of the bot instance interacting with the user 210, the bot server 202 is aware of state, in this case the previous dialog messages exchanged between the bot instance and the user 210, and may operate the bot instance accordingly based on the saved state. In the first use case, the bot server 202 may therefore operate the bot instance to respond with a first message, for example, "Typical Dental consultation costs $100" while in the second use case, the bot server 202 may operate the bot instance to respond with a second message, for example, "Typical Physiotherapy session costs $500".

Optionally, while operating the bot instance to interact with the user 210, the bot server 202 may further communicate with the cloud service 204 to retrieve additional data, specifically, in response to interaction with the user 210. For example, assuming that during the interaction with the user 210, a certain logic rule defines a certain dialog flow which requires additional information relating to the user 210 (e.g. account details, past purchases, etc.), to the requested service (e.g. live agent availability and/or service hours, etc.) and/or the like. In such case, the bot server 202 may access the cloud service 204 to retrieve the additional information required for the interaction with the user 210.

Optionally, the bot server 202 may initiate and/or adjust the operation of the bot instance interacting with the user 210 according to one or more of a plurality of contextual attributes identified for the user 210. The contextual attributes may include, for example, a gender, an age, an intent, a sentiment, a mood, a scene, a background, a geographical location, an environmental condition and/or the like.

The bot server 202 may collect, receive and/or otherwise obtain one or more of the contextual attributes by communicating with one or more of the context systems 230 and/or one or more of the NLP systems 240. For example, the bot server 202 may obtain one or more intents, sentiments, moods and/or the like identified for the user 210 by one or more of the NLP systems 240. In another example, the bot server 202 may obtain the scene, the background and/or the like of the user 210 from one or more of the image processing context systems 240. In another example, the bot server 202 may obtain one or more of the geolocation, the environmental conditions, the weather conditions and/or the like from one or more of the geolocation and/or weather context systems 240.

The bot server 202 may therefore adjust the initiation and/or the operation of the bot instance interacting with the user 210, specifically while applying the proactive mode, based on one or more conditions, for example, the behavior of the user 210, a trigger event, a contextual attribute and/or the like. In one exemplary use case, the bot server 202 may operate the bot instance based on the behavior of the user 210, for example, the bot server 202 may operate the bot instance to prompt a message such as, for example: "Hey, I noticed you are stuck on this page for a while. Can I help?". In another exemplary use case, the bot server 202 may operate the bot instance based on one or more external events defined as event triggers optionally relating to one or more of the contextual attributes, for example, the bot server 202 may operate the bot instance to prompt a message such as, for example: "Wow, the temperature is dropping fast! Are you somewhere warm?". In yet another exemplary use case, the bot server 202 may operate the bot instance based on one or more internal events defined as event triggers, for example, the bot server 202 may operate the bot instance to prompt a message such as, for example: "Hey, I just received news that your order is dispatched!". In another exemplary use case, the bot server 202 may operate the bot instance based on one or more of the contextual attributes which may be defined as event triggers, for example, the bot server 202 may operate the bot instance to prompt a message such as, for example: "Hey, I noticed you are driving a car, please make sure to use only voice control".

Optionally, the bot server 202 may manipulate an avatar generator to represent the bot instance initiated and operated to interact with the user 210. The bot server 202 may manipulate the avatar presented to the user 210 via his associated client device 208 according to the metadata received from the cloud service 204 and optionally based on one or more of the contextual attributes, one or more of the trigger events, the behavior of the user 210 and/or the like. Typically, the bot server 202 may provide the metadata, the contextual attribute(s), the trigger event(s), the behavior of the user 210 and/or the like to one or more of the digital human interaction systems 220 which may be adapted to create and manipulate the avatar presented to the user 210 according to the information received from the bot server 202.

Optionally, the bot server 202 may manipulate a text-to-speech synthesizer operated to produce an audio output to the at least one user to support an audible (speech, voice) bot instance initiated and operated to interact with the user 210. The bot server 202 may manipulate the text-to-speech synthesizer presented to the user 210 via his associated client device 208 according to the metadata received from the cloud service 204 and optionally based on one or more of the contextual attributes, one or more of the trigger events, the behavior of the user 210 and/or the like. Typically, the bot server 202 may provide the metadata, the contextual attribute(s), the trigger event(s), the behavior of the user 210 and/or the like to one or more of the digital human interaction systems 220 which may be adapted to setup and manipulate the text-to-speech synthesizer presented to the user 210 according to the information received from the bot server 202.

Optionally, the interaction with one or more of the users 210, the bot server 202 may direct one or more of the bot instances to a live agent connected via the could service 204 which may control the respective bot instance(s) to directly communicate with the respective user(s) 210.

Figure 3:
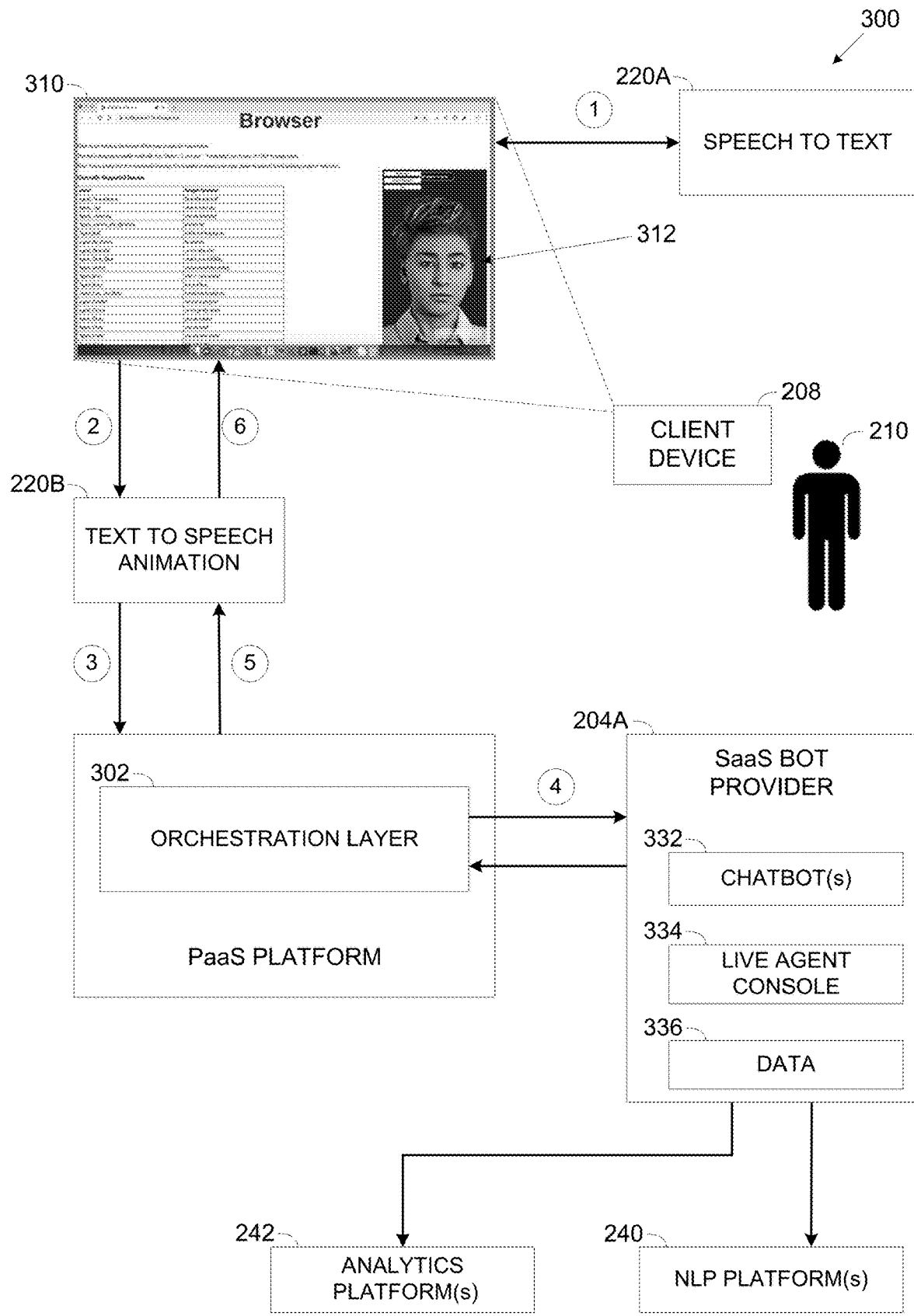
FIG. 3 is a schematic illustration of exemplary flow for controlling conversational bots interacting with users as known in the art.
Figure 4:
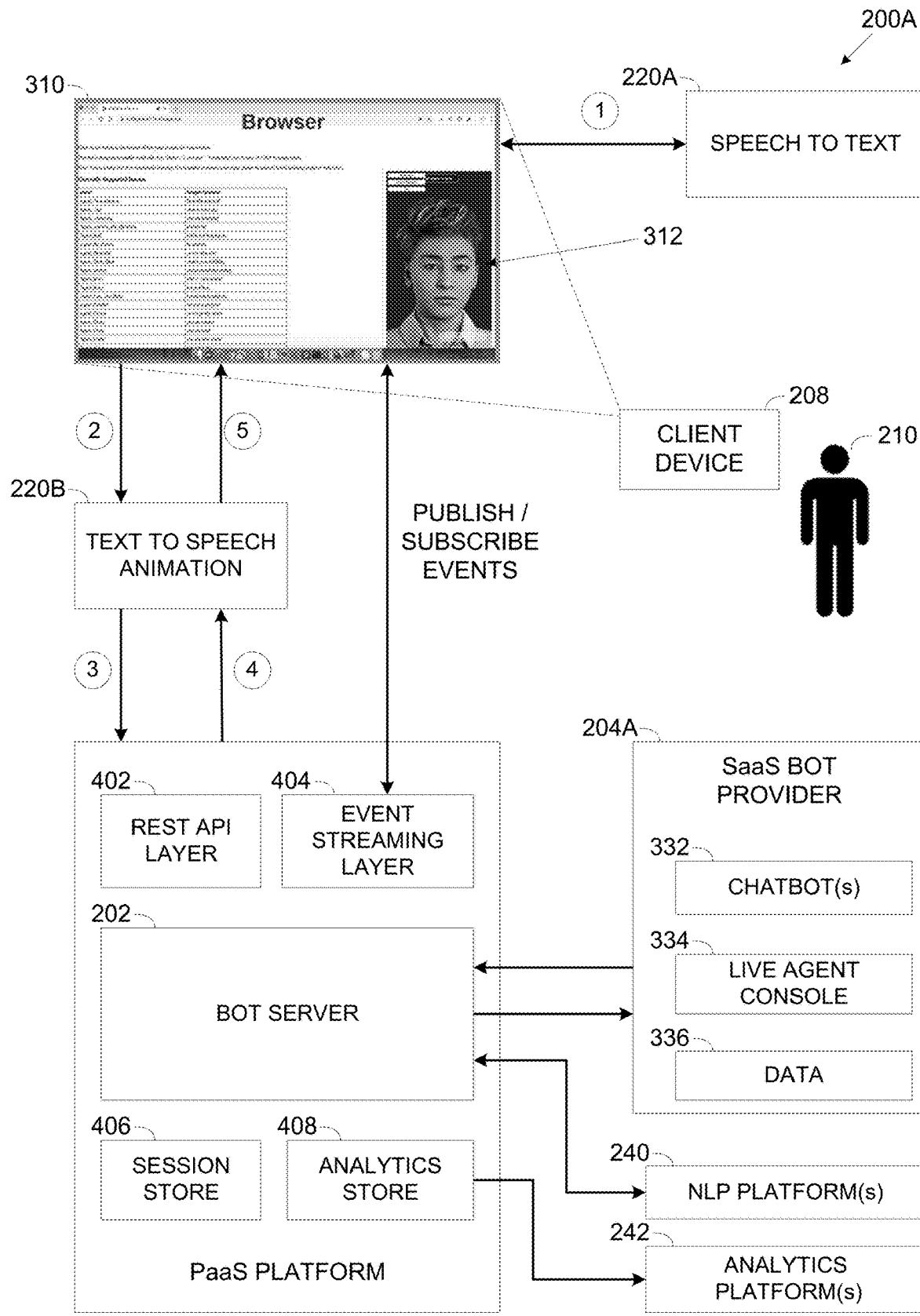
FIG. 4 is a schematic illustration of exemplary flow for controlling conversational bots interacting with users by using a bot server, in accordance with some embodiments.

Reference is now made to FIG. 3, which is a schematic illustration of exemplary flow for controlling conversational bots interacting with users as known in the art. Reference is also made to FIG. 4, which is a schematic illustration of exemplary flow for controlling conversational bots interacting with users by using a bot server, in accordance with some embodiments.

A seen in FIG. 3, an exemplary system environment 300 may comprise an exemplary SaaS bot provider 204A such as the cloud service 204 which may be used as known in the art to instantiate and operate a bot instance, specifically a conversational bot instance executed by a client device such as the client device 208 for interacting with an associated user such as the user 210. For example, the bot instance instantiated, operated and controlled by the SaaS bot provider 204A may be executed and rendered by a web browser application 310 executed by the client device 208. The SaaS bot provider 204A may include a chatbot(s) 332 comprising a framework for instantiating the bot instance, a live agent console 334 which may be used by a service and/or support person to chat with the user 210 via the bot instance and data 336 comprising the metadata defining the logic rules for the bot instances and the data relating to the organization, customers, clients and/or the like.

The cloud service 204 may further communicate with one or more NLP systems such as the NLP systems 240 and/or one or more analytics platform such as the analytics platforms 242.

Optionally, the bot instance executed and rendered by the browser 310 comprises and/or is represented by an avatar 312 which may interact with the user 210 via voice and speech messages. The avatar 312 may be typically animated by an animation system 220B provided by one or more of the digital human interaction systems 220. Moreover, the bot instance, specifically the avatar may interact with the user 210 via voice (speech) messages.

While the cloud service, typically implemented as a SaaS platform is a centralized service, one or more localized services and/or platforms may be employed to intermediate between the SaaS bot provider 204A and the client device(s) 208. For example, an orchestration layer 302 may be deployed using one or more PaaS frameworks, platforms and/or services, for example, Heroku and/or the like.

As seen, a speech (voice) message originating from the user 210 may be first converted to text (1), for example, by one or more speech to text systems 220A provided by one or more of the digital human interaction systems 220. The converted text message may be then pushed (2) to the animation system 220B which may transfer (3) the pushed text message to the orchestration layer 302. The orchestration layer 302 may then communicate (4) with the SaaS bot provider 204A to convey the test message to the cloud service 204 pushed and may wait to receive a response from the SaaS bot provider 204A. After receiving a response from the SaaS bot provider 204A, the orchestration layer 302 may send the response (5) to the animation system 220B which may render the animation (6) of the avatar 312 presented to the user 210 by the browser 310 executed by the client device 208.

As evident, the centralized SaaS bot provider 204A may be significantly distant from the client device(s) 208 in terms of network connectivity (network traffic hops and routing) which may impose major limitations on the control of the cloud service 204 over the bot instance(s).

First, the latency for the interaction between the user 210 and the bot instance operated and controlled by the distant SaaS bot provider 204A may be extremely high, in the range of several seconds, which may significantly affect and degrade the user experience of the user 210. Since voice may be the communication medium for interaction between the conversational bot instance and the user 210, high latency may lead to significant delay and response time in responding audibly via voice messages to the user 210. Such high delays may significantly degrade the user experience of the user 210. Optimally, the response time (combining all systems) should be lower than 500 milliseconds to prevent bad user experience. Moreover, the need to wait and typically poll for responses from the SaaS bot provider 204A may further increase the latency. Furthermore, in case the SaaS bot provider 204A communicates with the NLP system(s) 240 to obtain an intent, a sentiment and/or the like, an extra hop may be added which may further increase the overall response time.

Moreover, due to its centralized nature and deployment, the SaaS bot provider 204A may offer very limited scalability. Moreover, since the bot instances may be initiated in different geographical locations which may connect to the network via different network edge servers, the SaaS bot provider 204A may be unable to scale and provide multiple bot instances for multiple users 210 distributed across different geographical locations.

Furthermore, the centralized SaaS bot provider 204A may present major privacy issues since the bot service may be provided in one or more geographical areas which are different from the geographical location in which the SaaS bot provider 204A is located. The SaaS bot provider 204A may be therefore designed, operated and follow a first set of privacy rules, laws and/or regulations applicable to its geographical location which are different and may thus conflict and/or violate second sets of privacy rules, laws and/or regulations applicable in the service geographical areas where the bots are instantiated. For example, assuming a certain SaaS bot provider 204A is located in the USA and is configured to initiate one or more bot instances in Europe, the privacy rules, laws and/or regulations followed and applied by the SaaS bot provider 204A may conflict and/or violate the privacy rules, laws and/or regulations enforced in Europe.

In addition, due to its high network distance from the client devices 208 and its delayed communication, the SaaS bot provider 204A may operate the bot instance(s) mostly and typically only in passive mode, i.e., initiate and/or operate the bot instance(s) in response to messages received from the user(s) 210. Operating in passive mode only may naturally reduce flexibility, effectivity and/or benefit of the bot instance(s) to support the user(s) 210.

On top of that, the SaaS bot provider 204A may lack the ability to store the state, i.e. conditions, events, actions and/or the like detected and/or encountered during the interaction with the user 210 which may reduce the capability of the SaaS bot provider 204A to adapt and adjust the bot instance according to previous state data collected for the user 210 during the interaction thus further reducing the flexibility, effectivity and/or benefit of the bot instance(s) to support the user(s) 210.

The centralized SaaS bot provider 204A may be also highly limited in its ability to communicate and interact with external NLP platform(s) 240 and may therefore typically rely on its own NLP capabilities to analyze the messages received from the user(s) 210 to identify intents, sentiments, moods and/or the like. The inability to scale using $3^{rd}$ party NLP solutions, platforms and systems may naturally limit the quality of the NLP analysis available to the SaaS bot provider 204A. For example, assuming the bot instance need to identify an intent in an exemplary question received from the user 210, for example, "What is the current time in London?". The internal NLP capabilities available to the SaaS bot provider 204A may be limited in its ability to identify the intent expressed by the question which may be expressed by the following bot API response:

```
{
    "probabilities": [
        {
            "label": "Get Current Time",
            "probability": 0.99
        },
        {
            "label": "Describe London",
            "probability": 0.01
        }],
    "object": "predictresponse"
}
```

In contrast, one or more of the $3^{rd}$ party NLP platforms 240 may be more advanced and thus able to better identify the intent enclosed in the question received from the user 210. The $3^{rd}$ party NLP systems 240 may therefore respond with the following bot API response:

```
{
    "probabilities": [
        {
            "label": "Get Current Time",
            "probability": 0.99,
            "entity": "London",
        },
        {
            "label": "Describe London",
            "probability": 0.01,
            "entity": "London",
        }],
    "object": "predictresponse"
}
```

As seen, the intent identified by the $3^{rd}$ party NLP platforms 240 is clearly much more accurate compared to the response provided by the internal NLP capabilities of the SaaS bot provider 204A.

As seen in FIG. 4, in contrast to the legacy centralized deployment of the SaaS bot provider 204A in the system environment 300, a bot server such as the bot server 202 may be deployed in a system environment 200A such as the system environment 200 to initiate and operate one or more bot instances, specifically conversational bot instances optionally expressed by the avatar which are executed by one or more of the client devices 208 for interacting with the respective user(s) 210. In particular, as opposed to the centralized cloud service 204 which is thus distant from the client device(s) 208, the bot server 202 may be deployed in close network proximity to the client device(s) 208, for example, as an edge server at the network edge 206A.

Moreover, the bot server 202 may typically utilize one or more localized PaaS frameworks, platforms and/or services, for example, Heroku and/or the like. For example, the bot server 202 may use a REST API layer 402 provided by the PaaS platform for effectively communicating with the client devices 208 and/or with the SaaS bot provider 204A. The bot server 202 may further use an event streaming layer 404 for publishing and/or subscribing to one or more events at each of one or more of the client device 208, for example, messages, actions, instructions, external events, internal events, contextual attributes driven events and/or the like. In addition, the bot server 202 may use one or more resources provided by the PaaS platform to establish a session store 406 for storing state data, for example, conditions identified during interaction and engagement with the user 210, for example, a previous selection of the user 210, a response of the user 210, a contextual attribute relating to the user 210 and/or the like. Similarly, using one or more resources provided by the PaaS platform, the bot server 202 may establish an analytics store 408 for storing analytics data which may be exchanged with one or more of the analytics systems 242.

As described in step 102 of the process 100, during and/or following its initialization (boot-up) sequence, the bot server 202 may communicate with the SaaS bot provider 204A to obtain the metadata defining the logic rules for initiating and/or operating the bot instances at the client device(s) 208 for interacting with the respective user(s) 210.

Optionally, as need during the interaction with one or more of the users 210, the bot server 202 may direct one or more of the bot instances to the SaaS bot provider 204A where a live agent may take control over the respective bot instance(s) to directly communicate with the respective user(s) 210.

The architecture and deployment of the bot server 202 as described in FIG. 4 may present major advantages and benefits compared to the legacy centralized SaaS bot provider 204A as described in FIG. 3.

First, since the bot server 202 may be deployed at the network edge 206A, in each geographical location the bot server 202 may be in very close network proximity to the client devices 208 located in the respective geographical location. This may significantly reduce the latency and delays for the interaction between the user 210 and the bot instance operated and controlled by the bot server 202 thus significantly improving the user experience of the users 210 interacting with the bot instances. The architecture and deployment is further enhanced since the intermediating orchestration layer 320 is removed thus further reducing the latency and increasing performance of the bot instances operated and controlled by the bot server 202.

Moreover, as the bot server 202 may be deployed and/or implemented using standard available PaaS resources, the bot server 202 may be easily deployed and may be highly scalable since multiple such bot servers 202 may be deployed, specifically at the geographical area where the end users 210 are located thus maintaining the low latency and high performance.

Furthermore, in contrast to the centralized SaaS bot provider 204A, the bot server 202 deployed in each target geographical areas may apply and/or follow the privacy rules, laws and/or regulations applicable and enforced in the respective target geographical area thus ensuring no violation in data and/or user privacy.

In addition, taking advantage of the event streaming layer 404 provided by the PaaS platform, the bot server 202 may publish and/or subscribe to a plurality of events at the client device(s) 208 which may be configured as trigger events. As described herein before, in response to detection of one or more trigger events, the bot server 202 may proactively initiate and/or control the bot instance(s) thus significantly increasing flexibility, effectivity and/or benefit of the bot instance(s) to support the user(s) 210.

Also, the bot server 202 may store the state of one or more of the bot instance(s), for example, conditions, events, actions and/or the like detected and/or encountered during the interaction with the user 210. Specifically, the bot server may store the state data in the session store 406 implemented using the PaaS resources. Operating the bot instance(s) according to the stored state data, the bot server 202 may adapt and adjust the bot instance(s)' operation thus further increasing the flexibility, effectivity and/or benefit of the bot instance(s) to support the user(s) 210.

Lastly, taking advantage of the functional protocols, APIs and/or other provisions available by the PaaS, the flexible bot server 202 may easily communicate and interact with the NLP platform(s) 240, specifically external $3^{rd}$ part NL platform(s). Such external NL platform(s) 240 may be highly advanced and capable of accurately identifying one or more intents, sentiments, moods and/or the like of one or more of the users 210 based on analysis of the messages received from the respective user(s) 210 and optionally based on one or more of the contextual attributes identified for the respective user(s) 210.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms BOT and PaaS and SaaS platforms, services and technologies are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment may include a plurality of "optional" features unless such features conflict.

Throughout this application, various embodiments may be presented in a range format. It should be understood that the description in range format is merely for convenience and brevity and should not be construed as an inflexible limitation on the scope of embodiments. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of embodiments, which are, for clarity, described in the context of separate embodiments, may also be provided in combination in a single embodiment. Conversely, various features of embodiments, which are, for brevity, described in the context of a single embodiment, may also be provided separately or in any suitable subcombination or as suitable in any other described embodiment. Certain features described in the context of various embodiments are not to be considered essential features of those embodiments, unless the embodiment is inoperative without those elements.

Although embodiments have been described, it is evident that many alternatives, modifications and variations will be apparent to those skilled in the art. Accordingly, it is intended to embrace all such alternatives, modifications and variations that fall within the spirit and broad scope of the appended claims.

It is the intent of the Applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of providing configurable bot services adapted for interacting with users, comprising:
    providing to an edge server at least one bot instance adapted for communicating over a backbone of a communication network with at least one cloud service associated with a plurality of organizations and comprising metadata unique to each thereof to receive, through the backbone of the communication network, metadata comprising at least one logic rule defining an organization-specific instantiation of the at least one bot instance, operated to interact with users using client devices;
    receiving at least one request to initiate the at least one bot instance for interacting with at least one of a plurality of users using a respective one of a plurality of client devices connected to said network;
    initiating the at least one bot instance according to the at least one logic rule to communicate with the respective client device for interacting with the at least one user as the organization-specific instantiation of the at least one bot instance; and
    operating the at least one bot instance according to the at least one logic rule as the organization-specific instantiation of the at least one bot instance;
    wherein the edge server is located at an edge of the communication network, in closer network proximity to an access point providing the respective client device connectivity to the network than the at least one cloud service.

2. The method of claim 1, wherein the edge server implemented as a Platform as a Service (PaaS) applies at least one PaaS framework to facilitate a communication interface for communicating with the at least one cloud service.

3. The method of claim 1, wherein the at least one cloud service is utilized using at least one Software as a Service (SaaS) framework.

4. The method of claim 1, wherein the at least one logic rule defines the interaction with the at least one user comprises at least one of: a predefined dialog flow, a condition, and a trigger event.

5. The method of claim 1, further comprising initiating the at least one bot instance and/or adjusting the operation of the at least one bot instance based on a content of at least one message received from the respective client device, the at least one message originates from the at least one user interacting with the at least one bot instance.

6. The method of claim 1, further comprising initiating the at least one bot instance and/or adjusting the operation of the at least one bot instance proactively in response to at least one trigger event detected for the at least one user.

7. The method of claim 1, further comprising adjusting the operation of the at least one bot instance according to a state of the at least one bot instance defined by at least one condition of previous engagement with the at least one user.

8. The method of claim 1, further comprising retrieving additional data from the at least one cloud service in response to interaction with the at least one user.

9. The method of claim 1, further comprising adjusting the operation of the at least one bot instance according to at least one of a plurality of contextual attributes identified for the at least one user, the plurality of contextual attributes comprising at least one member of a group consisting of: a gender, an age, an intent, a sentiment, a mood, a scene, a geographical location, and an environmental condition.

10. The method of claim 9, further comprising communicating with at least one Natural Language Processing (NLP) service to obtain at least one of the plurality of contextual attributes.

11. The method of claim 9, further comprising communicating with at least one additional service to obtain at least one of the plurality of contextual attributes.

12. The method of claim 9, further comprising applying at least one image processing tool to analyze at least one image depicting the at least one user to extract at least one of the plurality of contextual attributes.

13. The method of claim 9, further comprising providing the metadata and the at least one contextual attribute for manipulation of an avatar presented to the at least one user to represent the at least one bot instance.

14. The method of claim 9, further comprising providing the metadata and the at least one contextual attribute for manipulation of at least one text-to-speech synthesizer operated to produce an audio output to the at least one user.

15. The method of claim 1, wherein the at least one logic rule comprising at least one member selected from the group consisting of:
   a dialog flow;
   a condition; and
   a trigger event;
   and wherein the at least one bot instance is adapted for performing, in response to receiving the metadata comprising the at least one logic rule from the at least one cloud service, at least one action selected from the group consisting of:
   constructing at least one decision tree;
   subscribing to or publishing at least one event on the respective client device; and
   presenting a message to the at least one user.

16. An edge server for providing configurable bot services adapted for interacting with users, comprising:
   at least one hardware processor executing a code, the code comprising:
      code instructions to obtain at least one bot instance adapted for communicating over a backbone of a communication network with at least one cloud service associated with a plurality of organizations and comprising metadata unique to each thereof to receive, through the backbone of the communication network, metadata comprising at least one logic rule defining an organization-specific instantiation of the at least one bot instance, operated to interact with users using client devices;
      code instructions to receive at least one request to initiate the at least one bot instance for interacting with at least one of a plurality of users using a respective one of a plurality of client devices connected to a network;
      code instructions to initiate the at least one bot instance according to the at least one logic rule to communicate with the respective client device for interacting with the at least one user as the organization-specific instantiation of the at least one bot instance; and
      code instructions to operate the at least one bot instance according to the at least one logic rule as the organization-specific instantiation of the at least one bot instance;
   wherein the edge server is located at an edge of the communication network, in closer network proximity to an access point providing the respective client device connectivity to the network than the at least one cloud service.

* * * * *